(12) United States Patent
Paxton et al.

(10) Patent No.: US 9,758,121 B2
(45) Date of Patent: Sep. 12, 2017

(54) SUPPLEMENTAL AIRBAGS AND RELATED AIRBAG SUPPORT SYSTEMS

(71) Applicant: Autoliv ASP, Inc., Ogden, UT (US)

(72) Inventors: Donald James Paxton, Romeo, MI (US); Michael Brian Kutchey, Ortonville, MI (US); David Robert Palm, Jr., Davisburg, MI (US); Dion Karl-Axel Kruse, Alingsås (SE); Russell Scott Gans, Farmington Hills, MI (US); Christina Renee Morris, Auburn Hills, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/855,198

(22) Filed: Sep. 15, 2015

(65) Prior Publication Data

US 2017/0072891 A1    Mar. 16, 2017

(51) Int. Cl.
*B60R 21/203*        (2006.01)
*B60R 21/205*        (2011.01)
(Continued)

(52) U.S. Cl.
CPC .......... *B60R 21/205* (2013.01); *B60R 21/203* (2013.01); *B60R 21/231* (2013.01);
(Continued)

(58) Field of Classification Search
CPC . B60R 21/203; B60R 21/2032; B60R 21/205; B60R 21/2338; B60R 2021/0009;
(Continued)

(56) References Cited

U.S. PATENT DOCUMENTS 3,752,501 A * 8/1973 Daniel ................. B60R 21/233
                                                    280/729
3,801,126 A    4/1974 Knight, IV et al.
(Continued)

FOREIGN PATENT DOCUMENTS

DE           2821621         1/1999
DE      EP 1211145 A1 *    6/2002   ........... B60R 21/203
(Continued)

OTHER PUBLICATIONS

Concise Explanation of Relevance of DE202004009450.
Concise Explanation of Relevance of DE10301715.
Concise Explanation of Relevance of DE29821621.

*Primary Examiner* — Laura Freedman
(74) *Attorney, Agent, or Firm* — Phillips Ryther & Winchester; Matthew D. Thayne

(57) ABSTRACT

Apparatus, methods, and systems for supplementing a primary airbag cushion, particularly during oblique angle vehicle impacts. Some embodiments may comprise an airbag module comprising an airbag cushion and a supplemental airbag support system configured to provide support to at least one of the airbag cushion and a vehicle occupant during oblique angle impact events. The supplemental airbag support system may comprise a deployable support structure configured to deploy adjacent to the airbag cushion during a vehicle impact event. The deployable support structure may be configured to supplement impact support provided by the airbag cushion during oblique angle vehicle impact events.

20 Claims, 6 Drawing Sheets

(51) Int. Cl.
*B60R 21/2338* (2011.01)
*B60R 21/231* (2011.01)
*B60R 21/233* (2006.01)
*B60R 21/00* (2006.01)

(52) U.S. Cl.
CPC ........ *B60R 21/233* (2013.01); *B60R 21/2338* (2013.01); *B60R 2021/0009* (2013.01); *B60R 2021/23107* (2013.01); *B60R 2021/23308* (2013.01); *B60R 2021/23386* (2013.01)

(58) Field of Classification Search
CPC .... B60R 2021/0023; B60R 2021/0233; B60R 2021/024; B60R 2021/23107; B60R 2021/23386; B60R 21/231; B60R 21/233; B62D 1/06; B62D 1/11
See application file for complete search history.

(56) References Cited

U.S. PATENT DOCUMENTS

| | | | | |
|---|---|---|---|---|
| 4,262,931 A * | 4/1981 | Strasser | ................ | B60R 21/233 280/729 |
| 5,529,337 A * | 6/1996 | Takeda | .................. | B60R 21/233 280/729 |
| 5,575,497 A * | 11/1996 | Suyama | ................ | B60R 21/231 280/730.1 |
| 5,609,363 A * | 3/1997 | Finelli | .................... | B60R 21/231 280/730.1 |
| 6,419,262 B1 * | 7/2002 | Fendt | .................... | B60R 21/231 280/729 |
| 6,464,252 B1 * | 10/2002 | Kreuzer | ................ | B60R 21/231 280/728.2 |
| 7,090,248 B2 * | 8/2006 | Jenkins | ................ | B60R 21/201 280/728.1 |
| 7,108,279 B2 * | 9/2006 | Rensinghoff | ......... | B60R 21/231 280/732 |
| 7,210,701 B2 * | 5/2007 | Meissner | .............. | B60R 21/231 280/729 |
| 7,441,799 B2 * | 10/2008 | Enders | .................. | B60R 21/203 280/731 |
| 7,673,901 B2 * | 3/2010 | Hanawa | ................ | B60R 21/233 280/729 |
| 8,636,301 B1 * | 1/2014 | Wang | .................... | B60R 21/232 280/730.2 |
| 8,764,057 B1 | 7/2014 | Jamison et al. | | |
| 8,789,847 B2 * | 7/2014 | Nagasawa | ............. | B60R 21/233 280/731 |
| 8,876,153 B2 * | 11/2014 | Dix | ........................ | B60R 21/233 280/729 |
| 8,882,138 B1 * | 11/2014 | Hicken | ................. | B60R 21/231 280/730.1 |
| 8,899,617 B2 * | 12/2014 | Fukawatase | .......... | B60R 21/232 280/730.2 |
| 9,096,257 B1 * | 8/2015 | Faruque | .................. | B62D 1/11 |
| 9,108,588 B2 * | 8/2015 | Fukawatase | .......... | B60R 21/233 |
| 9,114,777 B2 * | 8/2015 | Fukawatase | ......... | B60R 21/232 |
| 9,150,186 B1 * | 10/2015 | Belwafa | ................ | B60R 21/233 |
| 9,162,645 B2 * | 10/2015 | Cho | ...................... | B60R 21/205 |
| 9,180,834 B1 * | 11/2015 | Le | .......................... | B60R 21/231 |
| 9,205,798 B1 * | 12/2015 | Jindal | ..................... | B60R 21/16 |
| 9,227,587 B1 * | 1/2016 | Belwafa | ................ | B60R 21/205 |
| 9,248,799 B2 * | 2/2016 | Schneider | ............. | B60R 21/205 |
| 9,272,684 B1 * | 3/2016 | Keyser | ................... | B60R 21/237 |
| 9,321,421 B2 * | 4/2016 | Fukawatase | .......... | B60R 21/231 280/731 |
| 9,333,940 B2 * | 5/2016 | Hicken | ................... | B60R 21/33 |
| 9,358,945 B2 * | 6/2016 | Yamada | ................ | B60R 21/233 |
| 9,550,465 B1 * | 1/2017 | El-Jawahri | ........ | B60R 21/01512 |
| 9,573,555 B2 * | 2/2017 | Jang | ..................... | B60R 21/2338 |
| 2003/0116945 A1 * | 6/2003 | Abe | ....................... | B60R 21/231 280/729 |
| 2004/0188988 A1 | 9/2004 | Wipasuramonton et al. | | |
| 2005/0035577 A1 * | 2/2005 | Barko | ..................... | B60R 21/33 280/730.2 |
| 2005/0184489 A1 | 8/2005 | Kobayashi | | |
| 2005/0275199 A1 * | 12/2005 | Helmstetter | .......... | B60R 21/231 280/730.1 |
| 2006/0163848 A1 * | 7/2006 | Abe | ....................... | B60R 21/231 280/729 |
| 2006/0197320 A1 * | 9/2006 | Abe | ....................... | B60R 21/233 280/729 |
| 2015/0158452 A1 * | 6/2015 | Choi | ...................... | B60R 21/233 280/732 |
| 2015/0166002 A1 * | 6/2015 | Fukawatase | .......... | B60R 21/233 280/730.1 |
| 2015/0307052 A1 * | 10/2015 | Jaradi | .................... | B60R 21/231 280/743.2 |
| 2015/0307055 A1 * | 10/2015 | Cheng | ................... | B60R 21/203 280/728.3 |
| 2015/0307056 A1 * | 10/2015 | Cheng | ................... | B60R 21/231 280/729 |
| 2015/0367802 A1 * | 12/2015 | Fukawatase | .......... | B60R 21/205 280/732 |
| 2016/0046257 A1 * | 2/2016 | Yamada | ............... | B60R 21/2338 280/729 |
| 2016/0059817 A1 * | 3/2016 | Umehara | .............. | B60R 21/233 280/729 |
| 2016/0159311 A1 * | 6/2016 | Yamada | ................ | B60R 21/233 280/729 |

FOREIGN PATENT DOCUMENTS

| | | |
|---|---|---|
| DE | 10301715 | 7/2004 |
| DE | 202004009450 | 10/2004 |
| EP | 0657329 | 9/1994 |

* cited by examiner

SUPPLEMENTAL AIRBAGS AND RELATED AIRBAG SUPPORT SYSTEMS

SUMMARY

Injuries associated with oblique load vehicle impacts are often difficult to mitigate, even using current airbag systems. For example, during such impacts, chest and/or head injuries often occur due to an occupant rolling or sliding off of the airbag cushion, and seatbelt systems may not be capable of providing sufficient restraint to prevent such injuries.

The present inventors have therefore determined that it would be desirable to provide systems and methods that overcome one or more of the foregoing limitations and/or other limitations of the prior art. For example, the present inventors have determined that, by providing, in some embodiments, safety systems that may operate in conjunction with an airbag system to support the airbag cushion and/or provide support to an occupant's head to prevent lateral slide off, the ability of the airbag cushion to prevent injuries, particularly for oblique impacts, may be improved.

Thus, in some embodiments and implementations, a supplemental airbag support system may be configured to inflate adjacent to a primary airbag cushion, such as laterally relative to the primary airbag cushion in a location designed to prevent an occupant's head from rolling or sliding off of the primary cushion during an oblique angle impact event, or underneath the primary airbag cushion so that an overhang portion of the primary cushion receives additional support. In some embodiments and implementations, the supplemental airbag support system may comprise a non-inflatable support structure, such as one or more support plates or the like, which may be configured to deploy underneath the primary airbag cushion, again to provide support that may be particularly needed during oblique angle impact events.

In a more particular example of a vehicle airbag system according to some embodiments, the system may comprise an airbag module comprising an airbag cushion, and a supplemental airbag support system configured to provide support to at least one of the airbag cushion and a vehicle occupant during oblique angle impact events. The supplemental airbag support system may comprise a deployable support structure, which in some embodiments may comprise an inflatable support structure, that is configured to deploy adjacent to the airbag cushion during a vehicle impact event. The deployable support structure may be configured to supplement impact support provided by the airbag cushion during oblique angle impact events, by supporting a portion of the airbag cushion and/or by serving as a barrier to an occupant's head to keep the head from rolling or sliding off the airbag cushion, for example.

In some embodiments, the deployable support structure may comprise a supplemental airbag cushion. In some such embodiments, the supplemental airbag cushion may be configured to deploy from a vehicle steering column. Alternatively, the supplemental airbag cushion may be configured to deploy from a vehicle instrument panel. In some embodiments, the supplemental airbag cushion may be configured to deploy adjacent to one side of the airbag cushion to prevent a vehicle occupant's head from moving off of the airbag cushion during oblique angle impact events.

In some embodiments, the supplemental airbag cushion may comprise a toroid shape upon deployment. In some such embodiments, the supplemental airbag cushion may be configured to provide support to an overhang portion of the airbag cushion following deployment that extends beyond a perimeter of a vehicle steering wheel following deployment of the airbag cushion. In some such embodiments, the supplemental airbag cushion may be configured to extend about the vehicle steering wheel adjacent to and below the overhang portion of the airbag cushion following deployment.

In some embodiments, the deployable support structure may comprise a non-inflatable structure. In some such embodiments, the deployable support structure may comprise at least one support plate configured to deploy adjacent to and below an overhang portion of the airbag cushion following deployment.

Some embodiments may further comprise a tether coupled to the deployable support structure. Such a tether may be configured to force the deployable support structure towards the airbag cushion following deployment.

In another example of an airbag system according to other embodiments, the airbag system may comprise an airbag module comprising an airbag cushion and a supplemental airbag module, which may comprise a supplemental airbag cushion configured to deploy adjacent to the airbag cushion. In some embodiments, the supplemental airbag cushion may be configured to deploy from a vehicle steering column beneath the airbag cushion.

The supplemental airbag cushion may be configured to prevent a vehicle occupant's head from moving off of the airbag cushion during oblique angle impact events. The supplemental airbag module may further comprise means for coupling the supplemental airbag cushion to the airbag cushion, such as a tether and/or a hooked portion of the supplemental airbag cushion configured to extend over and adjacent to at least a portion of a proximal surface of the airbag cushion upon deployment.

Some embodiments may further comprise at least one sensor. The at least one sensor may be configured to determine an angle of oblique angle impact events. In some such embodiments, the supplemental airbag may be configured to deploy only during oblique angle impact events.

In some embodiments comprising a tether, the tether may be configured to be coupled to at least one of a vehicle steering column and a vehicle steering wheel.

In some embodiments comprising a supplemental airbag cushion, the supplemental airbag cushion may be configured to inflate to a different gas pressure than the airbag cushion. In some such embodiments, the supplemental airbag cushion may be configured to inflate to a higher gas pressure than the airbag cushion.

In another example of an airbag system according to other embodiments, the airbag system may comprise a driver-side airbag system comprising an airbag module comprising an airbag cushion. The airbag module may be configured to be positioned within a vehicle steering wheel such that the airbag cushion deploys from the vehicle steering wheel. The airbag system may further comprise an airbag support system configured to provide support to an overhang portion of the airbag cushion following deployment.

In some embodiments, the airbag support system may comprise a supplemental airbag cushion. In some such embodiments, the supplemental airbag cushion may comprise a toroid shape upon deployment. In some such embodiments, the supplemental airbag cushion may be configured to extend about the vehicle steering wheel adjacent to and below the overhang portion of the airbag cushion.

In some embodiments, the airbag support system may comprise at least one support plate configured to deploy adjacent to and below the overhang portion of the airbag cushion. In some such embodiments, the airbag support system may comprise a plurality of support plates configured to deploy at spaced intervals adjacent to and below the overhang portion. In some such embodiments, the plurality of support plates may be configured to deploy from the vehicle steering wheel.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to supplemental airbag support systems, such as supplemental airbag cushions and supplemental support structures configured to support a primary airbag cushion and/or a vehicle occupant's head, particularly during oblique angle impact events.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1A:
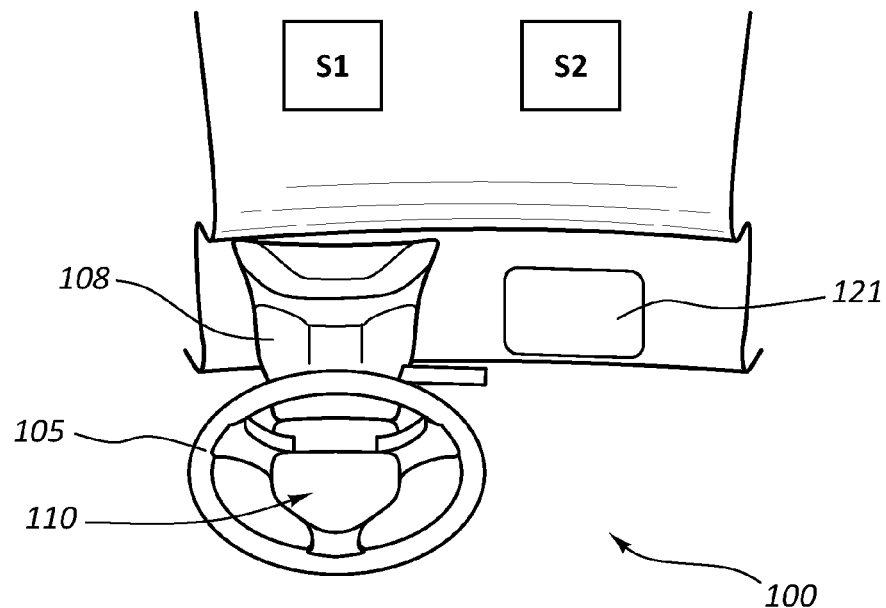
FIG. 1A is a perspective view of an embodiment of a vehicle airbag system, shown prior to deployment, comprising a supplemental airbag support system configured to provide lateral support to a primary airbag cushion and/or an occupant's head, particularly during oblique angle impact events.
Figure 1B:
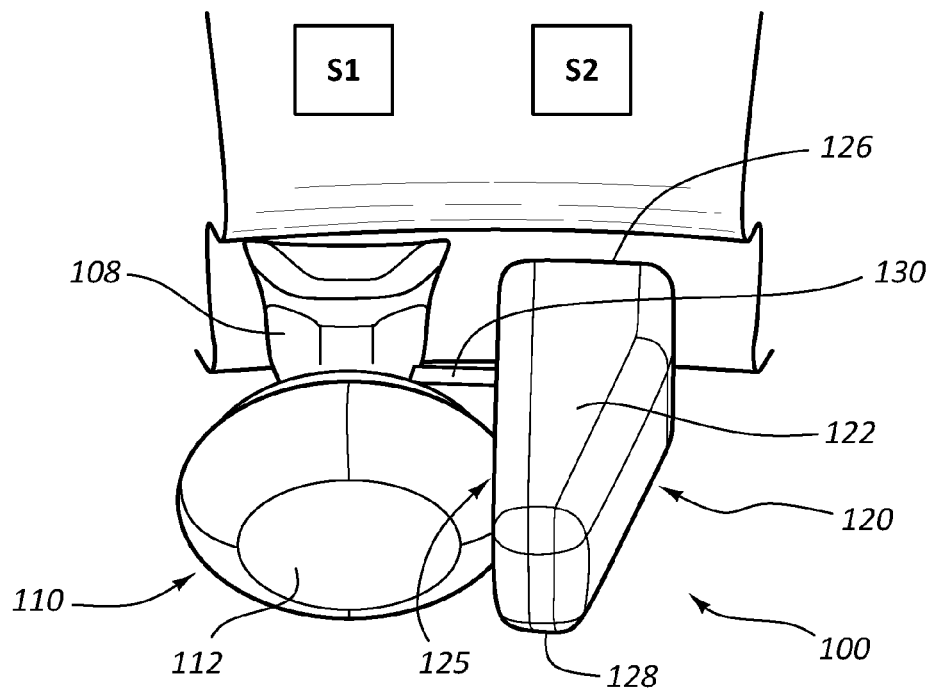
FIG. 1B is a perspective view of the airbag system of FIG. 1A shown after deployment of a primary airbag cushion and a supplemental airbag cushion.

FIGS. 1A and 1B depict the driver's side of a vehicle comprising airbag system 100 comprising an airbag module 110. FIG. 1A depicts airbag system 100 prior to deployment and FIG. 1B depicts airbag system 100 following deployment.

Airbag module 110 is positioned within a steering wheel 105 of the vehicle and, as depicted in FIG. 1B, comprises an airbag cushion 112 configured to deploy from steering wheel 105. Airbag system 100 further comprises a supplemental airbag support system 120 configured to provide support to at least one of the primary airbag cushion 112 of the system 100 and a vehicle occupant (not shown in the figures) during oblique angle impact events. Supplemental airbag support system 120 comprises a deployable support structure 122 configured to deploy adjacent to airbag cushion 112. More particularly, deployable support structure 122 comprises a supplemental airbag cushion that is configured to supplement impact support provided by airbag cushion 112 during oblique angle impact events.

The vehicle and/or airbag system 100 depicted in FIGS. 1A and 1B may further comprise one or more sensors configured to detect and/or predict oblique angle impacts. Thus, the depicted embodiment comprises a first sensor S1 and a second sensor S2. Sensors S1 and S2 may be configured to detect and/or predict various characteristics of a vehicle impact event, such as the direction of the impact angle relative to, for example, the airbag cushion or some other fixed point on the vehicle. Sensors S1 and S2 may comprise, for example, accelerometers or other suitable sensors, such as pressure sensors, sound sensors, vibration sensors, or the like. In some embodiments, first sensor S1 may comprise a first sensing axis and second sensor S2 may comprise a second sensing axis offset from the first sensing axis. In some such embodiments, the first sensing axis may be offset from the second sensing axis by ninety degrees, or at least about ninety degrees.

For example, in some embodiments, first sensor S1 may be aligned with a lateral or "x" axis direction and second sensor S2 may be aligned with a forward or "y" axis direction. By comparing signals from sensors S1 and S2, a direction of the impact may be determined. Of course, other characteristics of the impact, such as the intensity or force associated with the impact, may be obtained by sensors S1, S2, and/or other sensors. In some embodiments, pre-crash sensors, such as, for example, cameras, radar, and/or lasers, may be provided as well, or sensors S1 and/or S2 may comprise such pre-crash sensors. Other embodiments are contemplated in which a single sensor or set of more than two sensors may be provided.

In some embodiments, supplemental airbag support system 120 may be configured such that deployable support structure 122 only deploys upon detection of an oblique angle impact event and/or only upon detecting such an impact event within a certain threshold or range of thresholds. For example, deployable support structure 122 may only be deployed upon detection or prediction of an oblique impact event of a threshold severity and/or having a threshold lateral component. In other embodiments, however, supplemental airbag support system 120 may be configured such that deployable support structure 122 always deploys along with airbag cushion 112.

Deployable support structure 122 may be configured to deploy from a door or panel 121 that may be positioned in an instrument panel of the vehicle adjacent to the steering wheel 105. Panel 121 may be decorative so as to blend in with the surrounding portions of the instrument panel. Other embodiments are contemplated, however, in which deployable support structure 122 may be positioned to deploy adjacent to another airbag cushion, such as a passenger-side airbag. In such embodiments, panel 121 may be positioned elsewhere in the vehicle, or may be positioned in the instrument panel adjacent to a panel from which a primary, passenger airbag cushion will deploy.

Supplemental airbag support system 120 may further comprise a tether 130 configured to force the deployable support structure 122 towards the airbag cushion 112 following deployment. Tether 130 may be coupled to deployable support structure 122, airbag cushion 112, and/or another portion of the vehicle, such as the vehicle's steering column 108, in order to maintain suitable tension to force deployable support structure 122 towards airbag cushion 112 and/or otherwise keep deployable support structure 122 in a preferred location following deployment. In the depicted embodiment, tether 130 extends between steering column 108 and deployable support structure 122. Tether 130 is one example of a means for coupling a supplemental airbag cushion to another airbag cushion, such as a primary airbag cushion.

Other features may be used to maintain deployable support structure 122 in a proper position and/or ensure that this structure provides suitable support to an occupant's head and/or to a primary airbag cushion during oblique angle impact events. For example, in some embodiments, deployable support structure 122 may comprise a supplemental airbag cushion that is configured to inflate to a different gas pressure, such as a higher gas pressure, than airbag cushion 112. In some such embodiments, supplemental airbag cushion 122 may be configured to inflate to a substantially higher gas pressure than airbag cushion 112. For example, in some embodiments, supplemental airbag cushion 122 may be configured to inflate to a pressure that is at least about 5% greater than that of airbag cushion 112. In some embodiments, supplemental airbag cushion 122 may be configured to inflate to a pressure that is between about 5% and about 20% higher than that of airbag cushion 112. However, some embodiments are contemplated in which supplemental airbag cushion 122 may be configured to inflate to a pressure that is higher than that of airbag cushion 112 without being specifically in this range.

As illustrated in FIG. 1B, supplemental airbag cushion 122 may comprise a planar, or at least substantially planar, surface 125 that is configured to engage airbag cushion 112. In some embodiments, supplemental airbag cushion 122 may comprise a recessed area that may be configured to receive an adjacent portion of airbag cushion 112. In addition, it can be seen in FIG. 1B that supplemental airbag cushion 122 may comprise a wider base 126 that may taper towards narrow tip 128.

Figure 2:
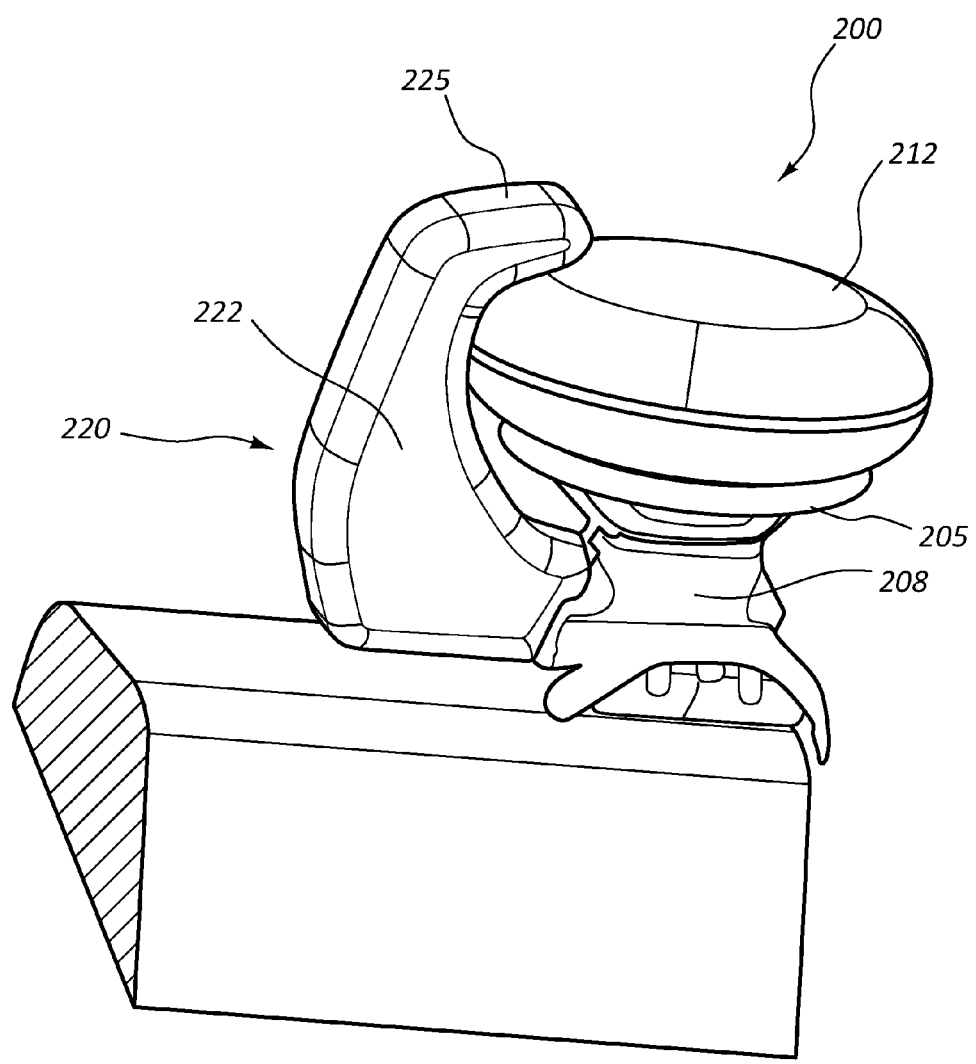
FIG. 2 is a perspective view of an alternative embodiment of a vehicle airbag system shown following deployment.

FIG. 2 illustrates another embodiment of an airbag system 200 shown following deployment. Airbag system 200 comprises a primary airbag cushion 212 that has been deployed from steering wheel 205. A supplemental airbag support system 220 comprises a deployable support structure 222 configured to supplement impact support provided by airbag cushion 212 during oblique angle impact events.

In this depicted embodiment, deployable support structure 222 also comprises a supplemental airbag cushion. However, unlike deployable support structure 122, deployable support structure 222 comprises a hooked portion 225 that is configured to extend over and adjacent to a portion of a proximal surface (relative to the driver/occupant following deployment) of airbag cushion 212 upon deployment. In such embodiments, a tether may not be needed in order to maintain suitable contact between airbag cushion 212 and supplemental airbag cushion 222 and/or otherwise maintain a desired position for supplemental airbag cushion 222 following deployment. Hooked portion 225 is therefore another example of a means for coupling a supplemental airbag cushion to another airbag cushion.

In addition, rather than being deployed from the vehicle's instrument panel, supplemental airbag cushion 222 is configured to deploy from steering column 208. More particularly, supplemental airbag cushion 222 is configured to deploy from a lateral portion of steering column 208 and wrap around a portion of airbag cushion 212 in a "C" shape. Of course, alternative embodiments are contemplated in which supplemental airbag cushion 222 may be configured to wrap around at least a portion of airbag cushion 212 but need not be in a C shape. For example, in some embodiments, supplemental airbag cushion 222 may be deployed from a vehicle instrument panel rather than steering column 208. In some such embodiments, supplemental airbag cushion 222 may comprise a relatively straight base section which may terminate at the proximal end in a hooked shape, similar to hooked portion 225.

Although an external tether is not depicted in FIG. 2, it is contemplated that a tether may also be provided in this embodiment if desired to further enhance the ability of the supplemental airbag cushion 222 to be coupled with airbag cushion 212 and/or to otherwise maintain supplemental airbag cushion 222 in a desired position.

As with supplemental airbag cushion 122, supplemental airbag cushion 222 may also be configured to deploy to a higher pressure than airbag cushion 212. In addition, in some embodiments, supplemental airbag cushion 222, or any of the other supplemental airbag cushions or deployable support structures disclosed herein, may be configured to deploy prior to the primary airbag cushion 212, or may otherwise be configured such that the inflation of supplemental airbag cushion 222 occurs prior to airbag cushion 212. This may be accomplished in some embodiments, by using a more powerful inflator for supplemental airbag cushion 222 and/or by deploying such inflator prior to the inflator associated with primary airbag cushion 212.

FIGS. 3A-3C and 4 depict still another alternative embodiment of an airbag system 300 shown following deployment. Airbag system 300 comprises a primary airbag cushion 312 that has been deployed from steering wheel 305. Airbag system 300 further comprises a supplemental airbag support system 320, which comprises a deployable support structure 322 configured to supplement impact support provided by airbag cushion 312 during oblique angle impact events.

Deployable support structure 322 again comprises a supplemental airbag cushion. However, unlike the deployable support structures previously described, supplemental airbag cushion 322 comprises a toroid shape upon deployment. In addition, supplemental airbag cushion 322 is configured to deploy below, or distal relative to a vehicle occupant, relative to airbag cushion 312. Moreover, supplemental airbag cushion 322 is configured to expand so as to extend laterally about the periphery of airbag cushion 312. In this manner, supplemental airbag cushion 322 may be configured to provide support to an overhang portion 313 of airbag cushion 312 following deployment. Overhang portion 313 may extend beyond a perimeter of vehicle steering wheel 305 following deployment, as best shown in FIG. 3C.

This configuration may provide support for airbag cushion 312, which may prevent or at least reduce the possibility of an occupant's head slipping off of airbag cushion 312. Providing a support for an overhang portion 313 may also allow for providing primary airbag cushions, such as cushion 312, having a larger diameter than would typically be used without having to also increase the size/diameter of the rim of steering wheel 305.

Figure 3A:
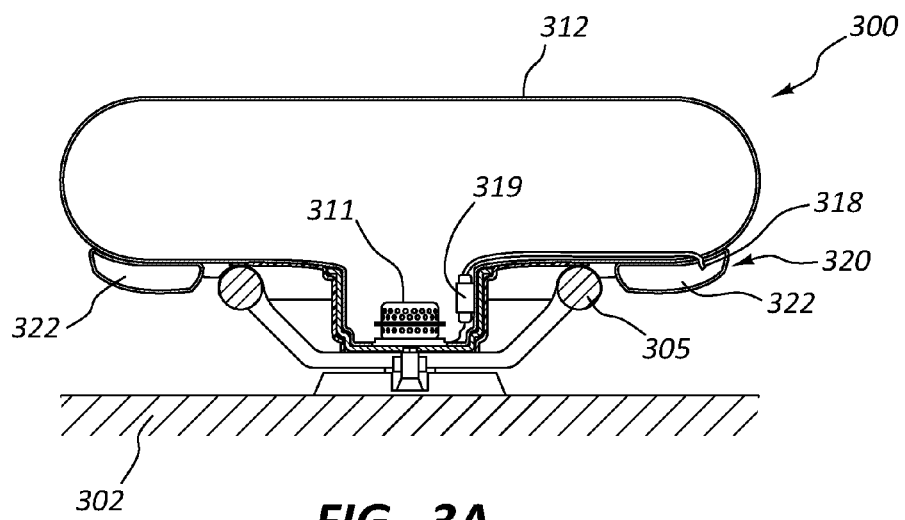
FIG. 3A is a cross-sectional view of still another embodiment of a vehicle airbag system during an initial stage of deployment.
Figure 3B:
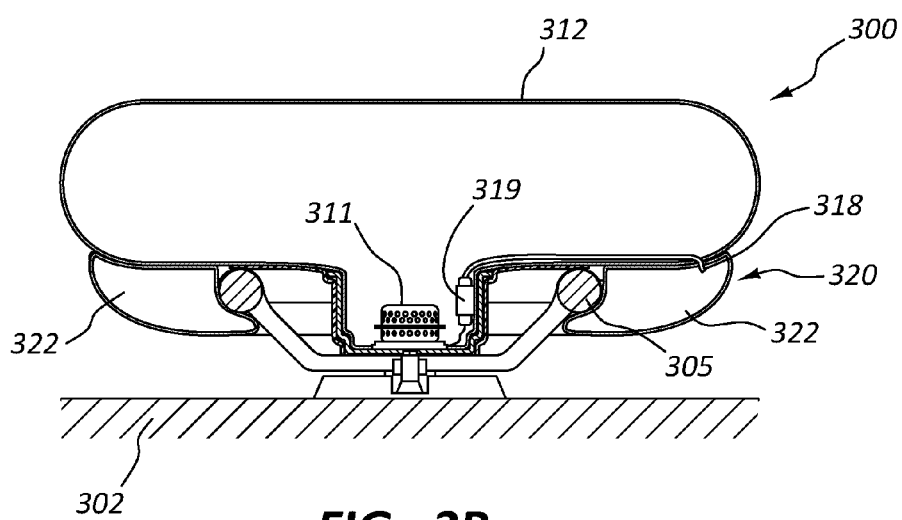
FIG. 3B is a cross-sectional view of the vehicle airbag system of FIG. 3A during a subsequent stage of deployment.
Figure 3C:
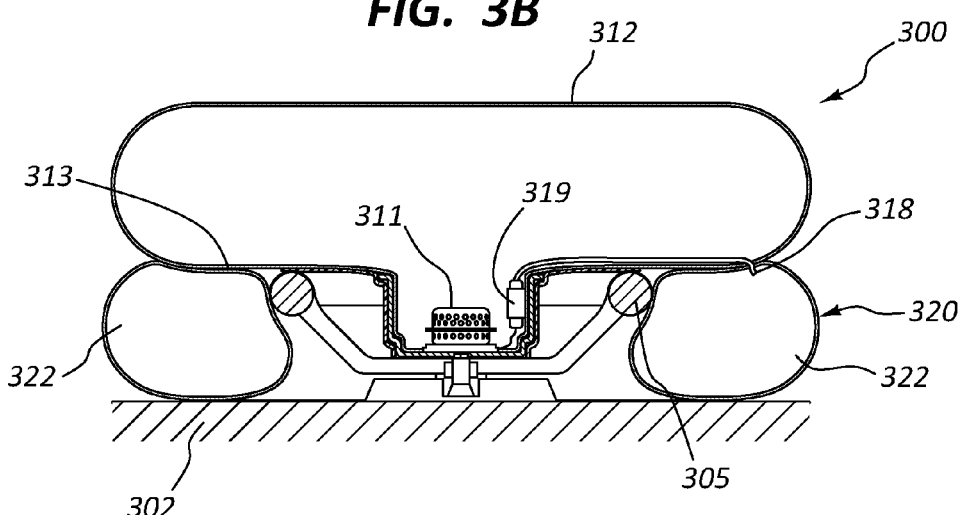
FIG. 3C is a cross-sectional view of the vehicle airbag system of FIGS. 3A and 3B shown following deployment.
Figure 4:
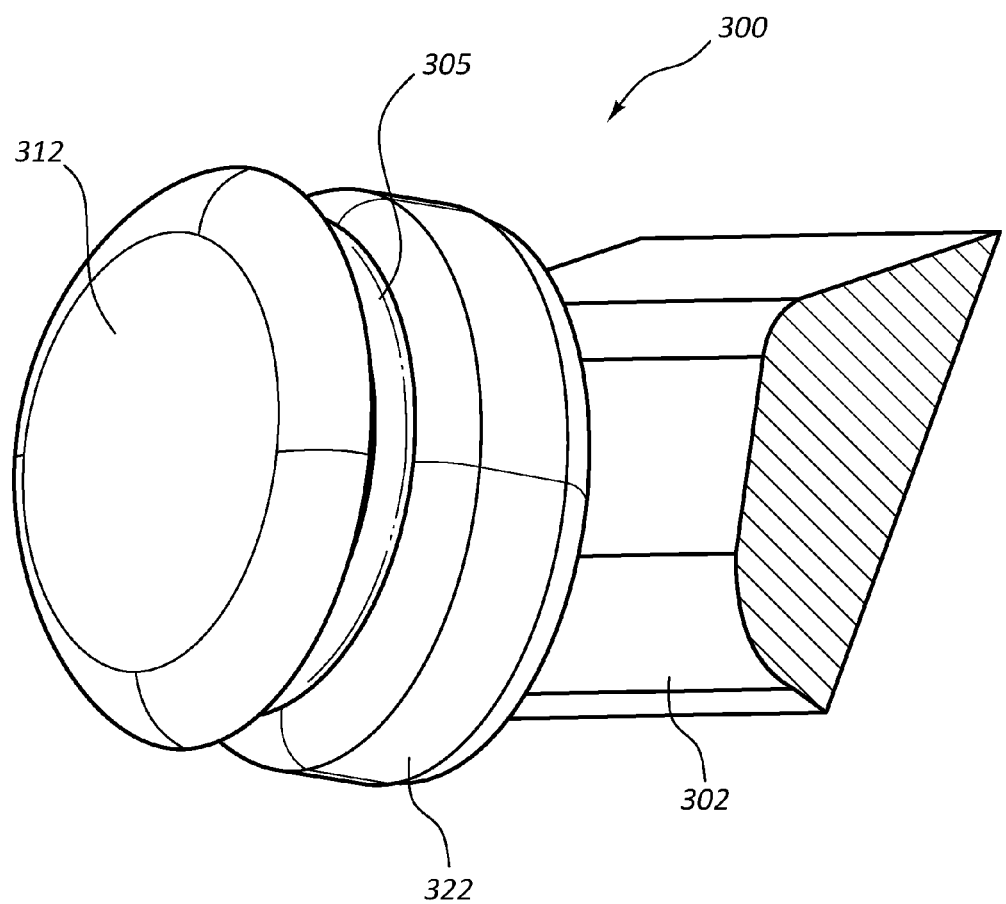
FIG. 4 is a perspective view of the vehicle airbag system of FIGS. 3A-3C following deployment.

In some embodiments, supplemental airbag cushion 322 may be folded and/or sewn against or otherwise coupled to primary airbag cushion 312, as shown in FIG. 3A. In some embodiments, a separate inflator, such as inflator 319, may be used specifically to inflate supplemental airbag cushion 322 separate from inflator 311. A tube 318, such as a fabric tube, may be sewn or otherwise coupled to and/or within an inflatable chamber of primary airbag cushion 312. In some embodiments, the inflatable chamber portion of supplemental airbag cushion 322 may be tack-stitched or otherwise releasably coupled against the inflatable chamber of primary airbag cushion 312. This releasable coupling may break or otherwise release during deployment of airbag cushion 312 and/or supplemental airbag cushion 322.

Thus, upon detection of an oblique angle impact event, or an oblique impact event of a threshold severity and/or having a threshold lateral component, inflator 319 may deliver inflation gases through tube 318 to supplemental airbag cushion 322. However, alternative embodiments are contemplated in which the same inflator 311 may be used to inflate both primary airbag cushion 312 and supplemental airbag cushion 322. As mentioned above, supplemental airbag cushion 322 may also be configured to deploy to a higher pressure than airbag cushion 312. In addition, in some embodiments, supplemental airbag cushion 322 may be configured to deploy prior to the primary airbag cushion 312, or may otherwise be configured such that the inflation of supplemental airbag cushion 322 occurs prior to airbag cushion 312 so as to provide sufficient support for airbag cushion 312 to deploy and extend past overhang portion 313 without risk of an occupant's head being moved off of airbag cushion 312.

As best seen in FIG. 3C, it can also be seen that, in some embodiments, supplemental airbag cushion 322 may be positioned to inflate in between primary airbag cushion 312 and a portion of the vehicle, such as instrument panel 302. This may further provide support for airbag cushion 312 (in particular, overhang portion 313) and thereby provide support to a vehicle occupant, particularly during oblique angle impact events. As also shown in FIG. 3C, as well as the perspective view of FIG. 4, in some embodiments, supplemental airbag cushion 322 may contact and/or wrap around steering wheel 305 upon inflation.

Figure 5A:
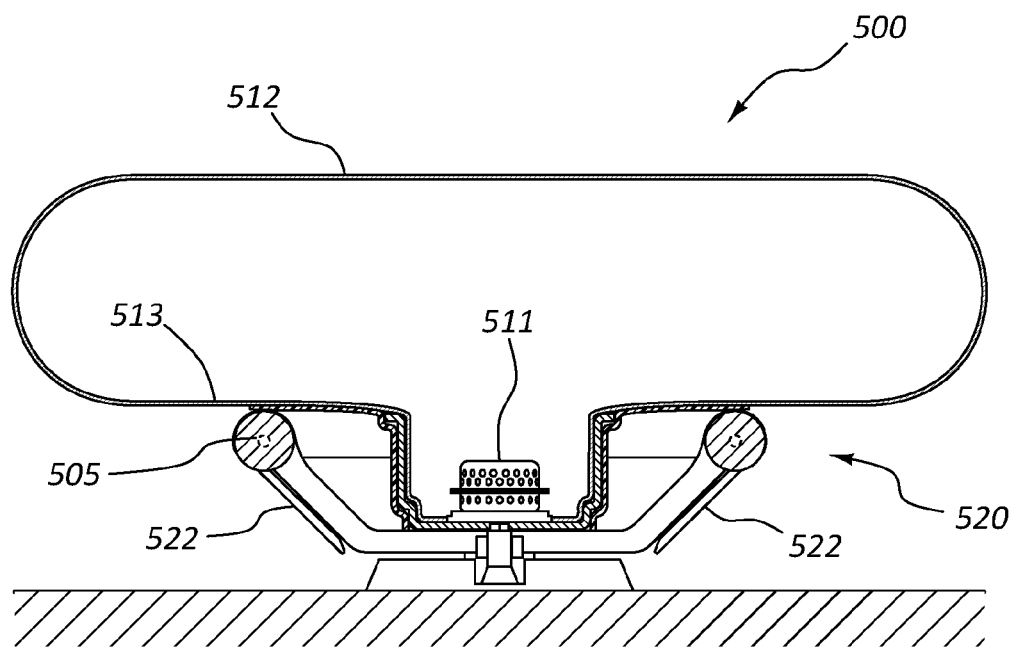
FIG. 5A is a cross-sectional view of yet another embodiment of a vehicle airbag system shown prior to deployment of a supplemental airbag support system.
Figure 5B:
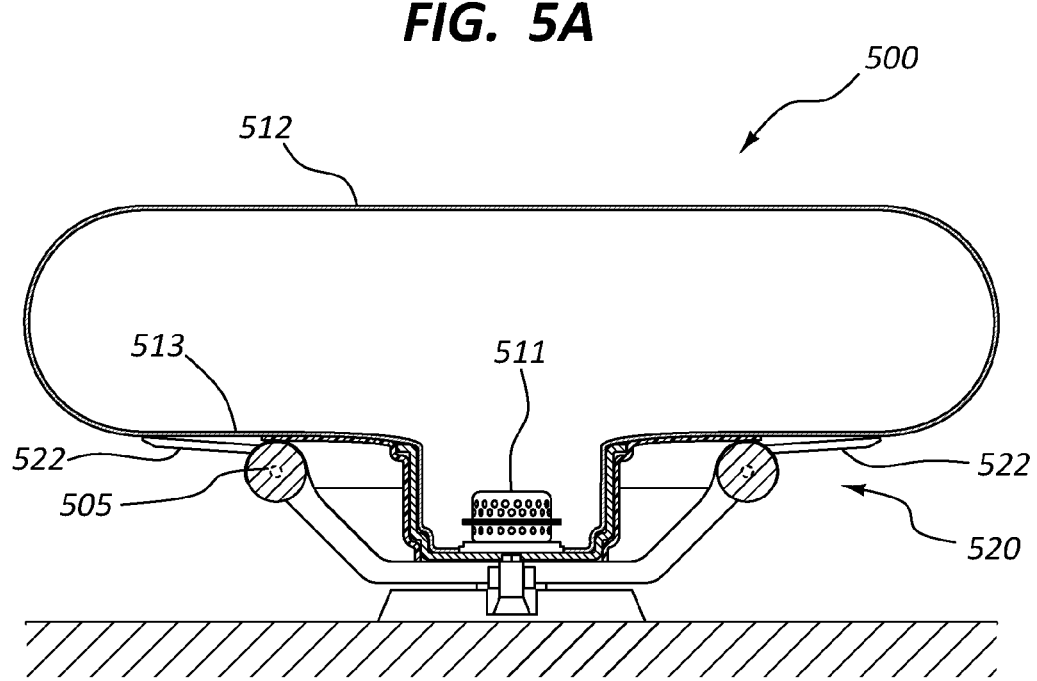
FIG. 5B is a cross-sectional view of the vehicle airbag system of FIG. 5A shown following deployment.
Figure 6:
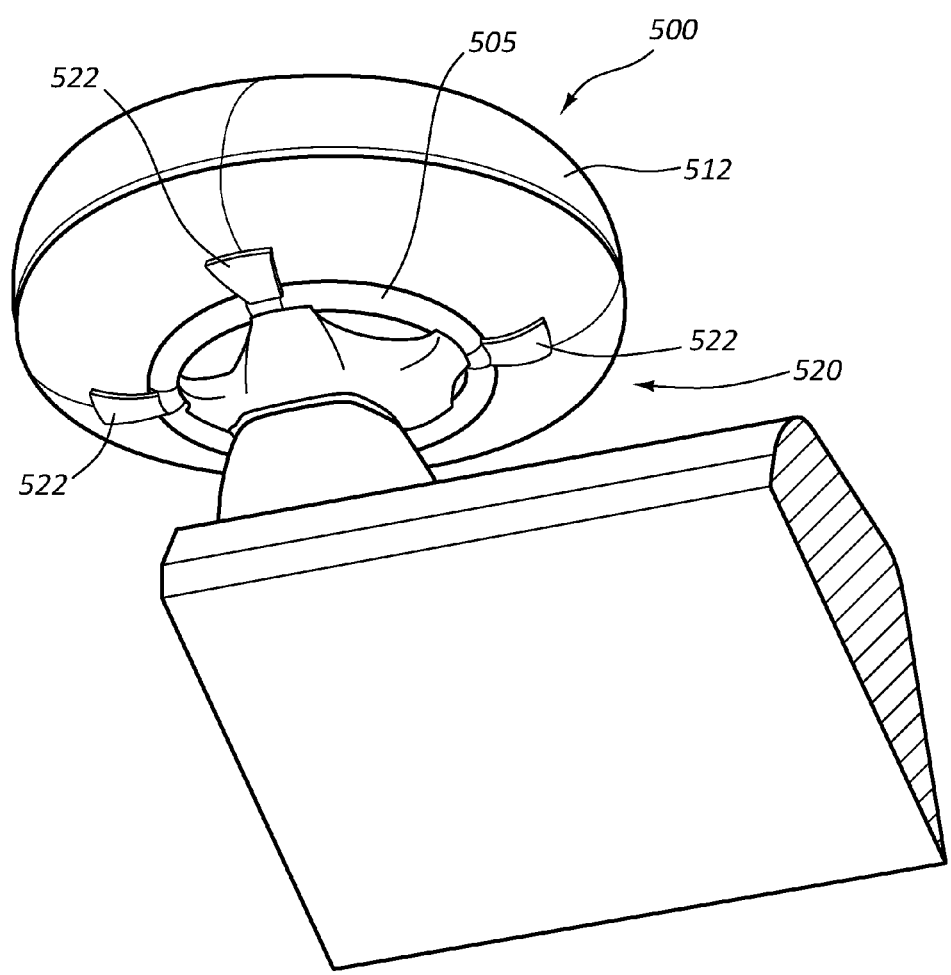
FIG. 6 is a perspective view of the vehicle airbag system of FIGS. 5A and 5B following deployment.

FIGS. 5A, 5B, and 6 depict yet another alternative embodiment of an airbag system 500 shown following deployment. Airbag system 500 comprises a primary airbag cushion 512 that has been deployed from steering wheel 505. Airbag system 500 further comprises a supplemental airbag support system 520, which comprises a deployable support structure 522 configured to supplement impact support provided by airbag cushion 512 during oblique angle impact events.

Unlike the deployable support structures previously described, deployable support structure 522 does not comprise a supplemental airbag cushion, nor does deployable support structure 522 comprise an inflatable structure. Instead, deployable support structure 522 comprises a non-inflatable support structure configured to deploy adjacent to and below the overhang portion 513. More particularly, in the depicted embodiment, this structure comprises a plurality of support plates 522 configured to deploy at spaced intervals adjacent to and below the overhang portion 513.

Support plates 522 are configured to initially be positioned in a stored position in which support plates 522 extend along a base portion of steering wheel 505, such as within spokes supporting steering wheel 505. In some embodiments, support plates 522 may be configured to be positioned within such spokes, or otherwise within a frame or base of steering wheel 505. In some such embodiments, support plates 522 may each comprise a corresponding panel or cover, similar to panel 121, from which they may be deployed.

Upon deployment, support plates 522 may be configured to pivot from the stored position shown in FIG. 5A to the deployed position shown in FIG. 5B, at which point they may be in position to support overhang portion 513 and thereby support an occupant's head during oblique angle impact events. In alternative embodiments, support plates 522, or another non-inflatable support structure, may be configured to deploy in other ways, such as sliding such plates laterally from beneath steering wheel 505, for example.

In some embodiments, one or more sensors, such as sensors S1 and/or S2 in FIG. 1, may be used to actuate support plates 522 upon detection of such an impact event. Alternatively, support plates 522 may be configured to be deployed in every impact event, irrespective of its oblique angle characteristics, along with airbag cushion 512. Because support plates 522 are not inflatable, a single inflator 511 may be used for the entire system 500. However, in some embodiments, the same signal used to deploy inflator 511 may also be used to deploy support plates 522, if desired.

In the depicted embodiment, airbag system 500 may comprise four support plates 522 that are configured to deploy at evenly spaced intervals about airbag cushion 512, as best shown in FIG. 6. However, a variety of alternative embodiments are contemplated. For example, in some embodiments, support plates may only be configured to extend laterally relative to an occupant, since lateral support may best provide support for oblique angle impact events to prevent an occupant's head from sliding off the primary cushion. In other embodiments, more than four support plates 522 may be provided so as to provide additional support where needed for other applications. In addition, although the support plates 522 depicted in the figures do not extend all of the way to the periphery of airbag cushion 512, in other embodiments support plates 522 may extend to, or beyond, this periphery so as to provide additional support.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag system, comprising:
   an airbag module comprising a primary airbag cushion configured to deploy from a vehicle steering wheel;
   a supplemental airbag support system configured to provide support to the primary airbag cushion during oblique angle impact events, wherein the supplemental airbag support system comprises a supplemental airbag cushion configured to deploy adjacent to the primary airbag cushion during a vehicle impact event, wherein the supplemental airbag cushion is configured to deploy from a panel separated from the vehicle steering wheel, and wherein the supplemental airbag cushion is configured to supplement impact support provided by the primary airbag cushion during oblique angle impact events; and
   a tether coupled to the supplemental airbag cushion, wherein the tether is configured to force the supplemental airbag cushion towards the primary airbag cushion following deployment.

2. The airbag system of claim 1, wherein the panel comprises a vehicle instrument panel.

3. The airbag system of claim 1, wherein the supplemental airbag cushion is configured to deploy adjacent to one side of the primary airbag cushion to prevent a vehicle occupant's head from moving off of the primary airbag cushion during oblique angle impact events.

4. The airbag system of claim 1, further comprising:
   a first inflator configured to inflate the primary airbag cushion; and
   a second inflator configured to inflate the supplemental airbag cushion.

5. The airbag system of claim 1, wherein the supplemental airbag cushion comprises an at least substantially planar surface configured to engage the primary airbag cushion following deployment of the primary airbag cushion and the supplemental airbag cushion.

6. An airbag system, comprising:
   an airbag module comprising a primary airbag cushion; and
   a supplemental airbag module comprising:
     a supplemental airbag cushion configured to deploy adjacent to the primary airbag cushion from a location separate from a location from which the primary airbag cushion is deployed, wherein the supplemental airbag cushion is configured to prevent a vehicle occupant's head from moving off of the primary airbag cushion during oblique angle impact events, and wherein the supplemental airbag cushion comprises an at least substantially planar surface configured to engage the primary airbag cushion following deployment of the primary airbag cushion and the supplemental airbag cushion; and
   means for coupling the supplemental airbag cushion to the primary airbag cushion, wherein the means for coupling physically couples the supplemental airbag cushion to the primary airbag cushion.

7. The airbag system of claim 6, further comprising at least one sensor, wherein the at least one sensor is configured to determine an angle of oblique angle impact events, and wherein the supplemental airbag cushion is configured to deploy only during oblique angle impact events.

8. The airbag system of claim 6, wherein the means for coupling the supplemental airbag cushion to the primary airbag cushion comprises a tether.

9. The airbag system of claim 8, wherein the tether is configured to be coupled to at least one of a vehicle steering column and a vehicle steering wheel.

10. The airbag system of claim 6, wherein the means for coupling the supplemental airbag cushion to the primary airbag cushion comprises a hooked portion of the supplemental airbag cushion, and wherein the hooked portion is configured to extend over and adjacent to at least a portion of a proximal surface of the primary airbag cushion upon deployment.

11. The airbag system of claim 6, wherein the supplemental airbag cushion is configured to inflate to a different gas pressure than the primary airbag cushion.

12. The airbag system of claim 6, wherein the supplemental airbag cushion is configured to deploy from a vehicle steering column.

13. The airbag system of claim 6, wherein the primary airbag cushion is configured to deploy from a vehicle steering wheel, and wherein the supplemental airbag cushion is configured to deploy from a vehicle panel separated from the vehicle steering wheel.

14. The airbag system of claim 6, further comprising:
   a first inflator configured to inflate the primary airbag cushion; and
   a second inflator configured to inflate the supplemental airbag cushion.

15. The airbag system of claim 6, wherein the supplemental airbag cushion comprises a wider base that tapers along at least a portion of the supplemental airbag cushion towards a narrower tip.

16. A driver-side airbag system, comprising:
   an airbag module comprising a primary airbag cushion, wherein the airbag module is configured to be positioned within a vehicle steering wheel such that the primary airbag cushion deploys from the vehicle steering wheel; and
   an airbag support system configured to provide support to an overhang portion of the primary airbag cushion following deployment, wherein the overhang portion extends beyond a perimeter of the vehicle steering wheel, wherein the airbag support system comprises a supplemental airbag cushion, wherein the supplemental airbag cushion is configured to inflate in between the vehicle steering wheel and a portion of a vehicle distal of the vehicle steering wheel to provide support for the overhang portion of the primary airbag cushion, and wherein the supplemental airbag cushion is configured to inflate to support the overhang portion about an entire periphery of the vehicle steering wheel upon inflation.

17. The airbag system of claim 16, wherein the supplemental airbag cushion comprises a toroid shape upon deployment, and wherein the supplemental airbag cushion is configured to extend about the vehicle steering wheel adjacent to and below the overhang portion of the primary airbag cushion.

18. The airbag system of claim 16, wherein the supplemental airbag cushion is configured to wrap around the vehicle steering wheel upon inflation.

19. The airbag system of claim 16, further comprising:
   a first inflator configured to inflate the primary airbag cushion; and
   a second inflator configured to inflate the supplemental airbag cushion.

20. The airbag system of claim 16, wherein the supplemental airbag cushion is configured to extend beyond a periphery of the vehicle steering wheel without being positioned between the vehicle steering wheel and the primary airbag cushion.

\* \* \* \* \*